June 7, 1966 R. P. KIDWELL 3,255,404
ELECTRICAL ENERGY TRANSMISSION SYSTEM
Original Filed May 29, 1961 2 Sheets-Sheet 1
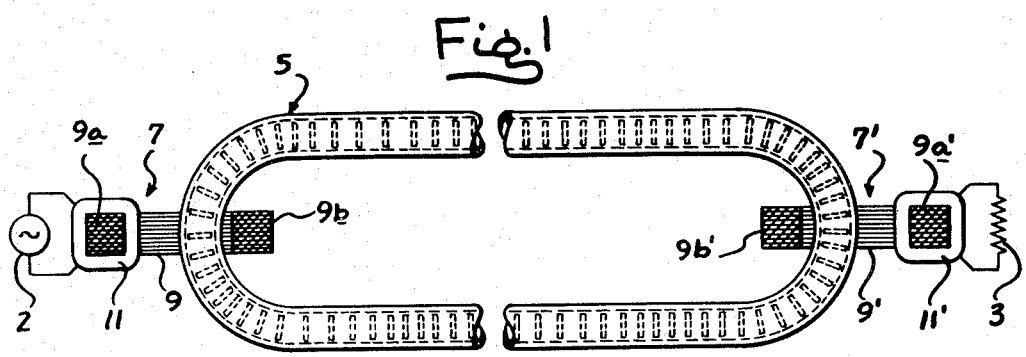
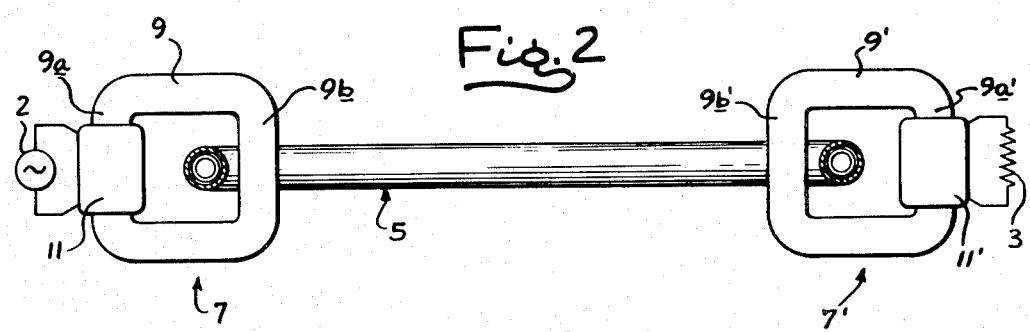
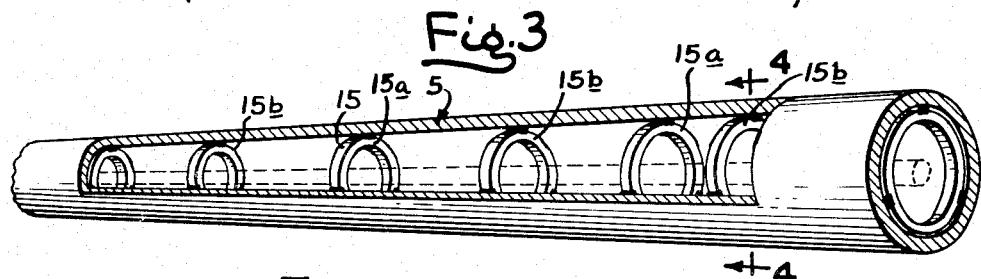
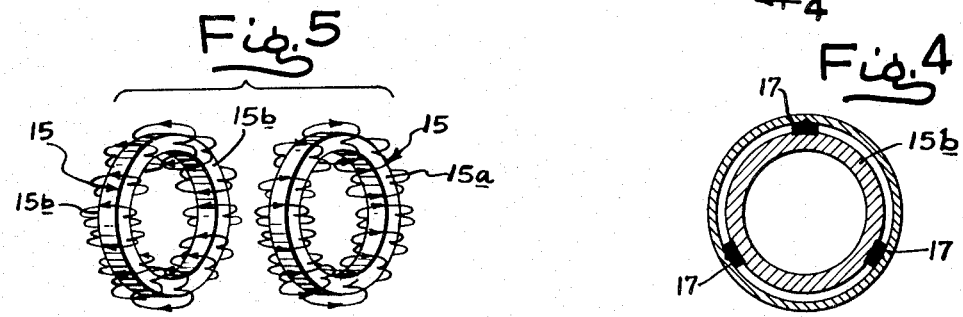
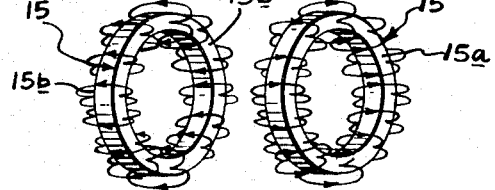
INVENTOR
ROBERT P. KIDWELL
by: Wallenstein Spagenberg & Hatten
ATTYS.

June 7, 1966    R. P. KIDWELL    3,255,404
ELECTRICAL ENERGY TRANSMISSION SYSTEM
Original Filed May 29, 1961    2 Sheets-Sheet 2

INVENTOR
ROBERT P. KIDWELL
by: Wallenstein, [signature]
ATTYS.

United States Patent Office 3,255,404
Patented June 7, 1966

3,255,404
ELECTRICAL ENERGY TRANSMISSION SYSTEM
Robert P. Kidwell, 2213 Calle de Suenos,
La Cruces, N. Mex.
Original application May 29, 1961, Ser. No. 113,443. Divided and this application Nov. 14, 1962, Ser. No. 237,584
5 Claims. (Cl. 323—44)

This application is a division of application Serial No. 113,443, filed May 29, 1961 on Apparatus for Controlling Conductive Fluids.

The present invention relates to apparatus for transmitting electrical energy through the medium of electronic plasmas, ionized gases, and other conductive or ionized fluids.

One of the objects of the invention is to provide a means for efficiently transmitting electrical energy by a plasma stream confined to flow in a very limited area within a conduit, and to provide a means for coupling energy to and from the plasma stream.

An all encompassing object of the present invention is to provide apparatus for satisfying the aforesaid objective and which is of simple and uncritical construction, can be economically fabricated and assembled on a mass production basis, and has a long service life under harsh and diverse conditions.

The features of the invention will be described in the specification to follow, the claims and the drawings wherein:

FIG. 1 is a plan view, partially in section, of an electrical power transmission system utilizing the present invention;

FIG. 2 is an elevational view of the embodiment shown in FIG. 1;

FIG. 3 is a perspective view, partially broken away, of a portion of the apparatus of FIG. 2 showing the fluid confining magnetic rings constituting one form of the present invention;

FIG. 4 is an enlarged transverse sectional view, taken substantially along section line 4—4 in FIG. 3;

FIG. 5 is a perspective view showing the magnetic lines of force of a pair of contiguous magnetic rings in the apparatus of FIGS. 1 through 4;

Figure 6:
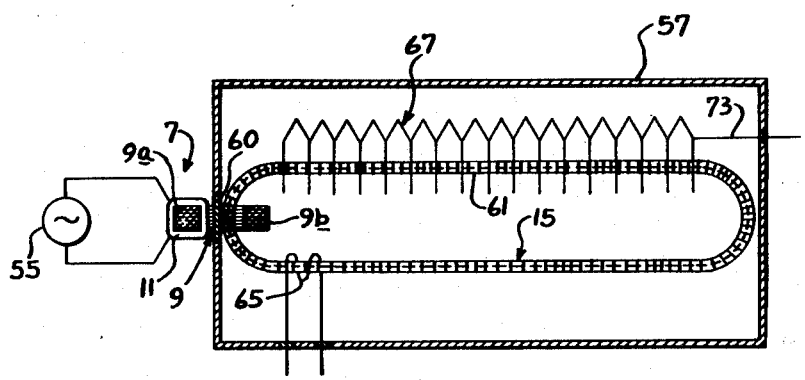
FIG. 6 is a sectional view through a modified form of the invention where high frequency energy is obtained from a flowing plasma stream confined by the magnetic rings shown in FIGS. 1 through 5.

Referring now to FIGS. 1 through 5, there is shown a power transmission system constituting one form of the present invention which transmits electrical power from a generator 2 to a load indicated by a resistor 3. Instead of using electric cables for power transmissions, the invention utilizes a stream of electronic plasma confined to a small area in the center of a conduit 5 made of metal or an insulating material. As is well known, electronic plasma consists of highly ionized gases which comprise a mixture of electrons and ions forming an extremely good conductor of electricity. Normally, such plasma is heated to a high temperature to maintain substantial ionization of the gas. It will be assumed that the plasma is heated and maintained at the high temperature required by any suitable means.

The conduit 5 is in the form of a continuous elongated loop. The energy from the generator 2 is coupled into the flowing plasma stream in the conduit 5 by a more or less conventional transformer unit generally indicated by reference numeral 7. This transformer has a core 9 made of magnetic material having a leg 9a around which primary windings 11 are wound and, a leg 9b around which one end of the elongated conduit 5 passes to constitute a secondary winding. The generator 2 is connected to the opposite ends of the primary winding 11 and the magnetic flux generated in the core 9 is coupled to the plasma within the conduit 5 to induce an alternating electrical field which imparts back and forth movement to the electrical particles within the plasma, effectively to generate an electrical current analogous to the generation of a current in a wire. In a similar way, the energy within the flowing plasma stream may be coupled therefrom by an output transformer 7' including a core 9' with legs 9a' and 9b'. The conduit 5 loops around the leg 9b' to constitute a primary winding of a transformer. A winding 11' winds around the leg 9a' to constitute a secondary winding of the transformer and a load resistor 3 is connected across the ends of the winding 11'.

It is important that the plasma be confined within the central portion of the conduit 5 as a continuous stream, so that the stream does not strike the walls of the conduit 5 and the diameter of the plasma stream remains fairly constant. Where undesired resonant conditions build up in the plasma stream, the diameter thereof can vary widely in diameter and perhaps build up to a maximum diameter where it would strike the conduit walls or become so small as to cause a discontinuity in the plasma stream, which adversely affect the efficiency of energy transmission and cause corrosion of the conduit walls.

In the particular form of the invention shown in FIGS. 1 through 5, the means for confining the plasma flow within the conduit 5 comprise a series of permanent magnet rings generally indicated by reference numeral 15. As illustrated, the conduit 5 has a cylindrical cross section and the ring magnets 15 are of a diameter somewhat less than the inside diameter of the conduit 5. The rings are supported within the conduit by spacer members 17 which may be adhesively or otherwise secured between the walls of the conduit and the ring magnets.

As shown most clearly in FIG. 3, each of the ring magnets has one of its poles extending along one of its axially facing sides 15a and the opposite pole extending along the opposite axially facing side 15b. The magnetic field pattern of each of the ring magnets is shown by the arrows in FIG. 5 and is similar in shape to a doughnut. In accordance with one important aspect of the present invention, the ring magnets are positioned in coaxial alignment within the conduit 5 and in alternating opposed relation so that the north pole side of a given ring magnet will face the north pole side of the adjacent magnet and the south pole side of any ring magnet will face the south pole side of the adjacent ring magnet. With such an arrangement, the direction of the lines of force of adjacent magnets oppose rather than reinforce one another. In effect, the integrity of the magnetic field of each of the ring magnets is maintained so that a magnetic field pattern is provided within the conduit 5 which alternates in directions along the conduit. The magnetic field pattern comprises the individual pattern elements contributed by each ring magnet, which extends generally axially within the ring and generally radially at points between the contiguous ring magnets.

The alternating magnetic field pattern described enables the invention to influence and thereby confine moving positively charged elemental particles, moving negatively charged elemental particles and even moving neutrally charged elemental particles carried along with the rest of the plasma stream. In the case of uncharged elemental particles, a displacement current or charge is usually induced therein by the varying magnetic field linking the same which enables such particles to be affected by the magnetic field.

When the ring magnets are spaced in a regular manner, it is possible for a resonant interaction to occur between the field and the moving plasma which causes wide variation in the diameter of the plasma stream. To minimize this condition, the ring magnets are spaced in an irregular manner along the conduit 5. That is to say, the spacing of these magnets varies and the spacing between the maximum and minimum spacings points varies so that an irregular spacing pattern results.

As previously indicated, the ability of the magnetic field to confine the plasma (or other conductive medium) is a function of the relative velocity between the plasma and the magnetic field in terms of the number of field reversals traversed by the plasma particle and the field strength. A large field strength requires a smaller relative velocity and a small field strength requires a large relative velocity for a given result. For example, if with a field strength of 1000 gauss good results are obtained if the plasma particles are subjected to $10^5$ field reversals per second, similar results will be achieved with a field strength of 100 gauss at $10^6$ field reversals per second.

The present invention is also applicable to a situation where the magnetic field producing elements do not follow the contour of a conduit, but follow an independent path within a much larger housing, as in the form of the invention shown in FIG. 6. The application of the invention illustrated therein is one for converting the output of an alternating voltage generator 55 at one frequency to a substantially higher frequency through the medium of a flowing body of ionized gas caused to traverse a continuous loop path located within an isolating housing or chamber 57. The chamber 57 may contain ionized hydrogen at a very low pressure. The output of the generator 55 is fed to the primary winding 11 wound on a core 9 of magnetic material forming part of a transformer 7 similar to the transformer described in connection with the embodiment of FIGS. 1 and 2. The core 9 has a pair of parallel legs 9a and 9b located on opposite sides of a wall of the chamber 57. The legs of the core bridging the ends of the legs 9a and 9b extend through isolating gaskets 60 on the chamber 57 to maintain a low pressure therein.

Figure 7:
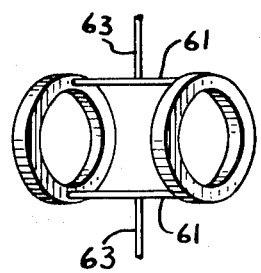
FIG. 7 is a perspective view of a pair of rings forming part of the apparatus shown in FIG. 7.

A series of ring magnets 15 are arranged together to form a continuous loop as in the form of the invention illustrated in FIGS. 1 and 2, one end of the loop extending around the leg 9b of the core 9 of the transformer 7. As above indicated, the ring magnets 15 in this form of the invention do not follow the contour of the chamber 57. The ring magnets 15 are held together by struts 61 to form an integral structure which in turn is suspended in any suitable way within the central portion of the chamber 57. For example, the ring magnets may be supported by insulating rods 63 secured to the walls of the chamber 57 (see FIG. 7).

The hydrogen within the housing 57 may be initially ionized by a heater coil 65 or the like in the manner commonly used to ionize the gas in fluorescent light bulbs. The ionized hydrogen ions are accelerated by the electromotive force induced within the portion of the ring magnet loop surrounding the core 9b, and the resulting flowing hydrogen ions are confined to the path defined by the ring magnets.

Figure 8:
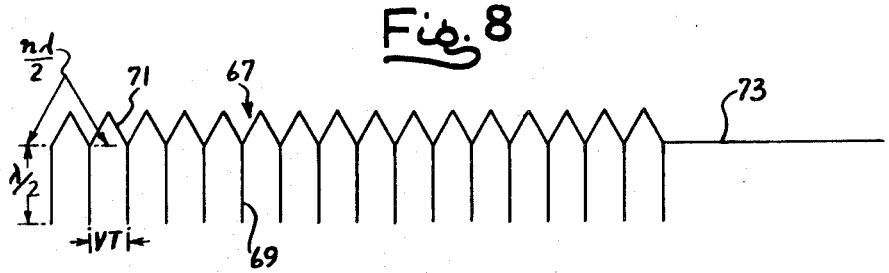
FIG. 8 is an enlarged view of the high frequency coupling unit forming part of the apparatus shown in FIG. 7.

Relatively high frequency energy can be extracted from the flowing hydrogen ion stream by means of a coupling unit generally indicated by reference numeral 67. The coupling unit 67 illustrated in FIG. 8 comprises a series of parallel conductor wires 69 each approximately one-half wave length long relative to the frequency which it is desired to generate therewithin. The wires are spaced apart a distance which the moving hydrogen ions will advance in a half cycle of the frequency to be generated. The wires 69 are interconnected by short lengths of wire 71 each of which is an odd multiple of a half wave length $n$ at the frequency involved. A conductor 73 is coupled to the inner end of one of the outer wires 69 to couple energy from the coupling unit 67. The coupling unit 67 in effect acts as a receiving antenna system which extracts energy from the moving ionized hydrogen stream at a frequency dependent upon the velocity of flow of the hydrogen ions and the geometric dimensions of the coupling unit 67.

It should be understood that numerous modifications may be made of the preferred forms of the invention described above without deviating from the broader aspects of the invention.

What I claim as new and desire to protect by Letters Patent of the United States is:

1. An electrical energy transmission system comprising: a core of magnetic material forming part of a transformer, a winding wound on said core, enclosure means forming an enclosed space isolated from the surrounding atmosphere, an ionized medium in said space, guide means for confining said ionized medium to flow in a continuous path in said space, said guide means looping around said core so that magnetic flux therein links the ionized medium confined to said path.

2. An electrical energy transmission system comprising: a source of alternating current to be transmitted, a core of magnetic material forming part of a transformer, a primary winding wound on said core and coupled to said source of alternating current, enclosure means forming an enclosed space isolated from the surrounding atmosphere, an ionized medium in said space, guide means for confining said ionized medium to flow in a continuous path in said space, said guide means looping around said core so that magnetic flux therein links the ionized medium confined to said path, and means for coupling energy from the ionized medium confined to said path.

3. An electrical energy transmission system comprising: a source of alternating current to be transmitted, a core of magnetic material forming part of a transformer, a primary winding wound on said core and coupled to said source of alternating current, enclosure means forming an enclosed space isolated from the surrounding atmosphere, an ionized medium in said space, guide means for confining said ionized medium to flow in a continuous path in said space, said guide means looping around said core so that magnetic flux therein links the ionized medium confined to said path, and means for coupling energy from the ionized medium confined to said path comprising a second core forming a part of a second transformer, said second core being linked by a portion of the ionized medium flowing in said path, a secondary winding on said second core into which is energized a voltage by the magnetic flux generated in the core by said ionized medium, and a load circuit coupled to said secondary winding.

4. An electrical energy transmission system comprising: a core of magnetic material forming part of a transformer, a winding wound on said core, means forming an enclosed space isolated from the surrounding atmosphere, an ionized medium in said space, guide means for confining said ionized medium to flow in a continuous path in said space, said guide means looping around said core so that magnetic flux therein links the ionized medium confined to said path, and means for coupling energy from the ionized medium confined to said path comprising a series of antenna elements extending parallel to one another and arranged transversely to a portion of said path, said antenna elements having a length resonant to a desired frequency to be generated therein by the flowing ionized medium.

5. An electrical energy transmission system comprising: a source of alternating current to be transmitted, a core of magnetic material forming part of a transformer, a primary winding wound on said core and coupled to said source of alternating current, means forming an enclosed space isolated from the surrounding atmosphere, an ionized medium in said space, guide means for confining said ionized medium to flow in a continuous path in said space, said guide means looping around said core so that magnetic flux therein links the ionized medium confined to said path, and means for coupling energy from the ionized medium confined to said path comprising a series of antenna elements extending parallel to one another and arranged transversely to a portion of said path, said antenna elements having a length resonant to a desired frequency to be generated therein by the flowing ionized medium.

References Cited by the Examiner

UNITED STATES PATENTS

| | | | |
|---|---|---|---|
| 2,473,477 | 6/1949 | Smith | 313—62 |
| 2,616,022 | 10/1952 | Arnaud | 323—50 X |
| 2,675,470 | 4/1954 | Wideroe | 328—237 |
| 2,961,557 | 11/1960 | Hubert | 313—62 |
| 3,138,019 | 6/1964 | Fonda-Bonardi | 313—63 X |

LLOYD McCOLLUM, *Primary Examiner.*

W. E. RAY, *Assistant Examiner.*